L. MAUERHOFER.
AUTOCLAVE TRAY FOR COOKING GLUE.
APPLICATION FILED SEPT. 19, 1918.

1,337,146.

Patented Apr. 13, 1920.
3 SHEETS—SHEET 1.

Inventor,
Louis Mauerhofer,
By
Attorneys.

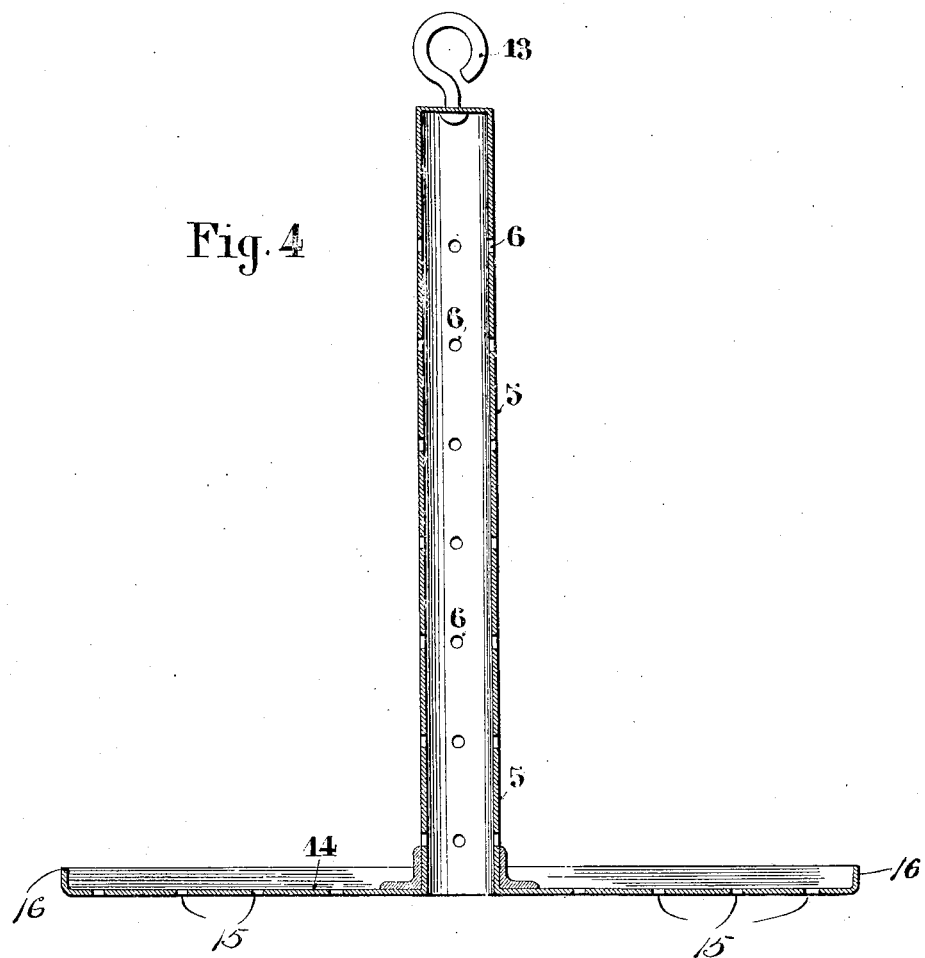

L. MAUERHOFER.
AUTOCLAVE TRAY FOR COOKING GLUE.
APPLICATION FILED SEPT. 19, 1918.

1,337,146.

Patented Apr. 13, 1920.
3 SHEETS—SHEET 3.

INVENTOR
Louis Mauerhofer
BY
ATTORNEYS

UNITED STATES PATENT OFFICE.

LOUIS MAUERHOFER, OF PARIS, FRANCE.

AUTOCLAVE-TRAY FOR COOKING GLUE.

1,337,146.  Specification of Letters Patent.  Patented Apr. 13, 1920.

Application filed September 19, 1918. Serial No. 254,785.

*To all whom it may concern:*

Be it known that I, LOUIS MAUERHOFER, a citizen of the Swiss Republic, and residing in Paris, France, 120 Rue Blomet, Tanner, have invented certain new and useful Improvements in and Relating to Autoclave-Trays for Cooking Glue, of which the following is a complete specification.

This invention has for its object an autoclave-tray employed in the preparation and cooking of the glues utilizable in all the industries, and more particularly in the leather-industry. In the autoclaves heretofore used, the glue is submitted to the action of the steam under a mass of such a dimension that the heat cannot penetrate it in a complete and uniform manner, and that its treatment may therefore be realized only at the surface of the mass.

The invention has for its object, on the contrary, to treat the glues under relatively thin and superposed layers, very penetrable by the heat. It is essentially characterized by perforated plates located above each other and enabling the heating steam, arising from the lower part of the autoclave, to attack the glue at the central part of the plates and at the peripheral part.

In the accompanying drawing, which illustrates, by way of example, a constructional form of the invention:

Fig. 3 shows, on an enlarged scale, a plate or element of the tray in section upon line 3—3 of Fig. 2;

Fig. 4 shows, on an enlarged scale, a bottom plate.

Figure 1:
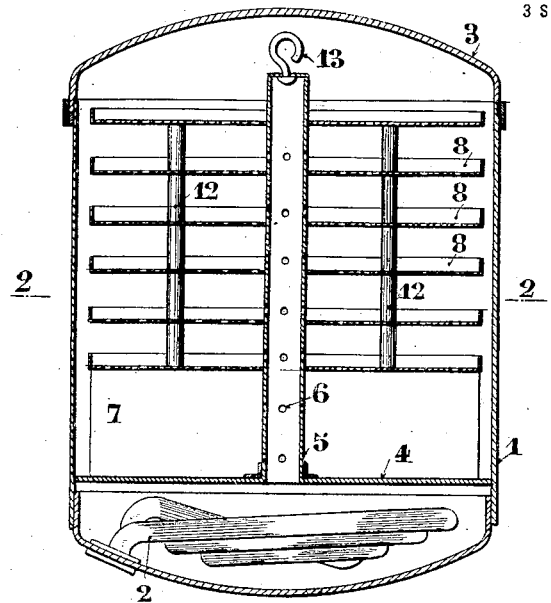
Figure 1 is a section, in vertical elevation, through an autoclave provided with the tray being the object of the invention.
Figure 2:
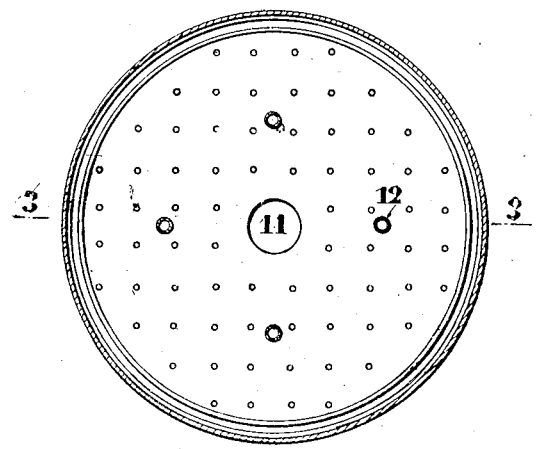
Fig. 2 is a horizontal section of Fig. 1 upon line 2—2.

The autoclave 1 has the usual form and comprises a heating coil 2 located at the lower part 1ª, as well as a cover 3; it is provided with all the organs utilized in the ordinary autoclaves, which organs are not shown in the drawing.

The tray being an object of the invention comprises (Fig. 1) a bottom-plate 4 consisting of a circular disk provided, at its center, with a stack 5 bored with apertures 6. The bottom 4, in Fig. 1, is provided with a tank 7, the top of which is perforated. Above this tank are arranged plates 8, 8, 8, shown on a larger scale in Fig. 3 and constituted by a flanged disk 9 drilled with apertures 10, and provided with a passage 11 having a diameter slightly greater than the external diameter of the stack 5. The disk is provided with legs 12, four in number for each plate. The apertures 6 provided in the stack 5 are placed at the level of each of the plates 8. The stack 5 is provided with a hook 13 for the operation by means of a tackle.

The working is as follows:

The glue is arranged in thin layers upon each of the plates 8. The water located at the lower part of the autoclave and heated by the heating coil generates steam which passes through the apertures 6 and spreads between the different plates for exerting its heating action upon the glue placed on said plates. The glue, which has undergone the attack of the steam at the center of the plates and also at their periphery, flows out through the apertures 10 and, in the case of Fig. 1, is collected in the tank 7, wherefrom it is extracted and conveyed to the place of utilization.

In Fig. 4, the stack 5, instead of being provided with a tank, comprises merely a bottom-plate 14 bored with apertures 15 and provided with a flange 16; this plate operates like the plates 8, but the glue, instead of being collected in a tank, falls directly into the water in which the coil is located and may be extracted therefrom for being conveyed to the place of utilization.

Figure 5:
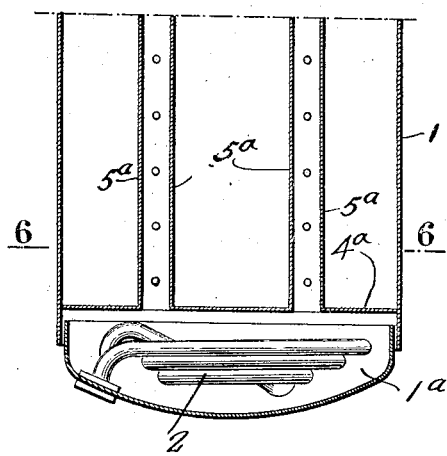
Fig. 5 shows an autoclave with a modified form of bottom plate.
Figure 7:
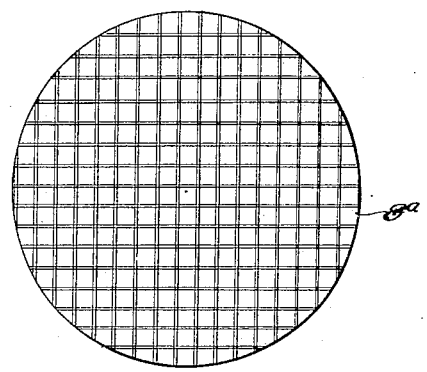
Figs. 7, 8 and 9 are modified forms of the glue supporting plates.
Figure 6:
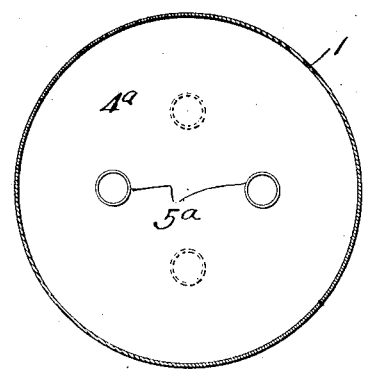
Fig. 6 is a horizontal section on the line 6—6 of Fig. 5.
Figure 8:
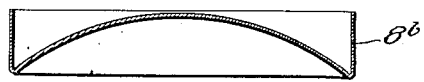
Figure 9:
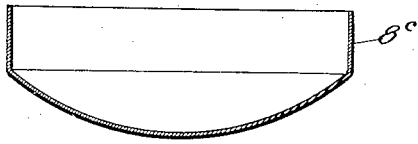

Instead of one stack, two or more may obviously be provided as shown in Figs. 5 and 6, wherein 4ª is the bottom plate and 5ª the stacks. The plates may be either perforated as shown in Fig. 7, or convex or concave for the flowing as shown in Figs. 8 and 9.

The invention offers the advantage of enabling to operate upon relatively thin layers of glue more penetrable by the heat than the masses which are actually operated upon.

What I claim is:—

1. An autoclave for the preparation of glue, comprising a vessel adapted to contain water in its lower portion and provided with means for heating the water, a plate supported in the vessel above the water and having a central tubular and apertured member extending therefrom, a tank having a perforated top and supported on said plate, and a plurality of flanged plates above the tank, said plates being supported one above the other and each having means for permitting the flowing of the glue therefrom into the tank.

2. An autoclave for the preparation of glue, comprising a vessel adapted to contain water in its bottom and provided with means for heating the water, a flanged and apertured plate supported in the vessel above the water and having a central tubular and apertured member projecting therefrom, and a plurality of flanged and apertured plates, said plates each having a central opening through which the said tubular member extends and legs on their lower faces.

3. A tray for the purpose described, comprising a flanged and apertured plate provided with an apertured tubular member projecting therefrom, and a plurality of flanged and apertured plates, said plates each being provided with a central opening through which the tubular member extends and with legs for supporting them one above the other.

In testimony whereof I have hereunto set my hand, at Paris, France, this seventeenth day of August, 1918.

LOUIS MAUERHOFER.